(12) United States Patent
Keane et al.

(10) Patent No.: US 8,950,858 B2
(45) Date of Patent: Feb. 10, 2015

(54) SYSTEM AND METHOD OF SURFACING A LENS, SUCH AS A LENS FOR USE WITH EYEGLASSES

(71) Applicant: Digital Vision, Inc., Portland, OR (US)

(72) Inventors: Gordon Keane, Portland, OR (US); John Thompson, Ridgefield, WA (US)

(73) Assignee: Digital Vision, Inc., Portland, OR (US)

( * ) Notice: Subject to any disclaimer, the term of this patent is extended or adjusted under 35 U.S.C. 154(b) by 0 days.

(21) Appl. No.: 14/290,661

(22) Filed: May 29, 2014

(65) Prior Publication Data

US 2014/0268032 A1  Sep. 18, 2014

Related U.S. Application Data

(62) Division of application No. 13/212,048, filed on Aug. 17, 2011, now Pat. No. 8,777,409, which is a division of application No. 12/854,113, filed on Aug. 10, 2010, now Pat. No. 8,020,990, which is a division of application No. 11/758,540, filed on Jun. 5, 2007, now Pat. No. 7,784,937.

(51) Int. Cl.
  *G02C 7/02* (2006.01)
(52) U.S. Cl.
  CPC . *G02C 7/022* (2013.01); *G02C 7/02* (2013.01)
  USPC ................. 351/159.01; 351/159.71
(58) Field of Classification Search
  CPC .................................. G02C 7/02; G02C 7/022
  USPC ........................................ 351/159.01, 159.71
  See application file for complete search history.

(56) References Cited

U.S. PATENT DOCUMENTS

| | | |
|---|---|---|
| 4,185,897 A | 1/1980 | Frieder |
| 4,573,121 A | 2/1986 | Saigo et al. |
| 4,580,883 A | 4/1986 | Shinohara |
| 4,710,193 A | 12/1987 | Volk |
| 4,958,280 A | 9/1990 | Pauly et al. |
| 5,368,790 A | 11/1994 | Greshes |
| 5,485,399 A | 1/1996 | Saigo et al. |
| 5,805,336 A | 9/1998 | Dalzell et al. |
| 5,880,809 A | 3/1999 | Lieberman et al. |
| 5,983,201 A | 11/1999 | Fay |
| 6,019,470 A | 2/2000 | Mukaiyama et al. |
| 6,051,091 A | 4/2000 | Wood et al. |
| 6,058,373 A | 5/2000 | Blinn |
| 6,082,856 A | 7/2000 | Dunn et al. |
| 6,089,713 A | 7/2000 | Hof et al. |

(Continued)

FOREIGN PATENT DOCUMENTS

JP   2002133219 A   5/2002

OTHER PUBLICATIONS

"Announcing Sweep," Product brochure of Digital Vision, inc., www.thedvi.com (applicant herein), published before Aug. 10, 2010, 2 pgs.

(Continued)

*Primary Examiner* — Scott J Sugarman
(74) *Attorney, Agent, or Firm* — Perkins Coie LLP (57) ABSTRACT

A system and method of forming surfaces on eyeglass lenses is described. In some examples, the surface is a spherical, cylindrical or spherocylindrical surface at a center of the lens and an aspherical surface at a periphery of the lens. In some examples, forming the surface on the lens reduces the thickness of the lens at the periphery of the lens.

22 Claims, 9 Drawing Sheets

(56) References Cited

U.S. PATENT DOCUMENTS

| | | | |
|---|---|---|---|
| 6,454,408 B1 * | 9/2002 | Morris et al. | ............ 351/159.01 |
| 6,508,553 B2 | 1/2003 | Gao et al. | |
| 6,637,880 B1 | 10/2003 | Yamakaji et al. | |
| 6,792,401 B1 | 9/2004 | Nigro et al. | |
| 6,871,955 B2 | 3/2005 | Yamakaji et al. | |
| 7,029,116 B2 | 4/2006 | Roscini | |
| 7,051,209 B1 | 5/2006 | Brickell | |
| 7,054,836 B2 | 5/2006 | Christensen et al. | |
| 7,188,082 B2 | 3/2007 | Keane et al. | |
| 7,784,937 B2 | 8/2010 | Keane et al. | |
| 7,840,444 B2 | 11/2010 | Mellon et al. | |
| 8,002,406 B2 | 8/2011 | Arrigotti et al. | |
| 8,020,990 B2 | 9/2011 | Keane et al. | |
| 2002/0118337 A1 | 8/2002 | Perrott et al. | |
| 2002/0143653 A1 | 10/2002 | DiLena et al. | |
| 2003/0086055 A1 | 5/2003 | Morris et al. | |
| 2003/0090625 A1 | 5/2003 | Izumitani et al. | |
| 2004/0004633 A1 | 1/2004 | Perry et al. | |
| 2004/0075807 A1 | 4/2004 | Ho et al. | |
| 2004/0246440 A1 | 12/2004 | Andino et al. | |
| 2005/0021137 A1 | 1/2005 | Blake et al. | |
| 2005/0204881 A1 | 9/2005 | Chen | |
| 2005/0206834 A1 | 9/2005 | D'Agostino | |
| 2005/0206840 A1 | 9/2005 | Roscini | |
| 2006/0098161 A1 | 5/2006 | Dumange et al. | |
| 2009/0048670 A1 | 2/2009 | Grierson et al. | |
| 2011/0153054 A1 | 6/2011 | Hagen et al. | |
| 2011/0299031 A1 | 12/2011 | Keane et al. | |
| 2011/0301740 A1 | 12/2011 | Arrigotti et al. | |
| 2011/0304816 A1 | 12/2011 | Arrigotti et al. | |

OTHER PUBLICATIONS

"Aspheric Flat-Top 35," Product brochure of Bristol C & D, Inc., www.bcdlens.com, believed published before Aug. 10, 2010, 2 pgs.
"Bristolite Flat-Top," Product brochure of Bristol Consulting & Development, Inc., Miami, Fl., believed published before Aug. 10, 2010, 2 pgs.
"Cosmolit Aspheric Plus Lenses," Product brochure of Rodenstock GMBH, believed published before Aug. 10, 2010, 6 pgs.
"Lenscrafters," http://www.lenscrafters.com, Apr. 24, 1999, pp. 1-8 [last accessed Sep. 26, 2002].
"PlanetRx.com Shows Vision by Adding Contact Lenses and Eye Care Products to Product Mix," PR Newswire, Jan. 19, 2000, 3 pages.
"Single Vision Premium Lenses," Rodenstock GMBH, http://www.rodenstock.ca/index.php/product/item/12, downloaded Mar. 19, 2010, 1 pg.
"The Ultimate in Aspher," product brochure of Pentax Corporation (now division of Hoya Corporation of Japan), believed published before Aug. 10, 2010, 1 pg.
PCT International Search Report for Application No. PCT/US02/21610, Mailed on Jan. 15, 2003, 3 pages.

* cited by examiner

| | | Spherical | Cylindrical | Periphery |
|---|---|---|---|---|
| DV | O.D | - 5.25 | - .25 | + 2.0 at 40 |
| | O.S | + .50 | 0 | --- |
| NV | O.D | + 1.00 | - 1.00 | -30% at 50 |
| | O.S | + 1.00 | - 1.00 | --- |
| | | | | |

I. M. Patient     5/10/07

*FIG. 7*

SYSTEM AND METHOD OF SURFACING A LENS, SUCH AS A LENS FOR USE WITH EYEGLASSES

CROSS REFERENCE TO RELATED APPLICATIONS

This application is a divisional of U.S. patent application Ser. No. 13/212,048, filed Aug. 17, 2011, entitled "SYSTEM AND METHOD OF SURFACING A LENS, SUCH AS A LENS FOR USE WITH EYEGLASSES," which is a divisional of U.S. patent application Ser. No. 12/854,113, filed Aug. 10, 2010, entitled "SYSTEM AND METHOD OF SURFACING A LENS, SUCH AS A LENS FOR USE WITH EYEGLASSES," which is a divisional of U.S. patent application Ser. No. 11/758,540, filed Jun. 5, 2007, entitled "SYSTEM AND METHOD OF SURFACING A LENS, SUCH AS A LENS FOR USE WITH EYEGLASSES," the entirety of which are all incorporated by reference herein.

BACKGROUND

Traditionally, the manufacturing of a lens for use in eyeglasses requires a number of steps, including:
- choosing a semi-finished lens blank with a finished front surface (base curve) and an unfinished back surface,
- grinding the back surface with a lathe, such as a toric lathe, that creates a spherical concave or convex surface (such as a cylindrical or spherical surface) on the back surface to place an optical system on the surface used to correct the vision of a user of eyeglasses, and
- lapping the back surface to smooth the surface to a desired curvature to finish the optical system.

Typically, the curvature of the back surface is limited to the size of the lap piece. For example, laps are generally produced to create curvatures on lens surfaces. The laps are formed to produce a specific curvature on a surface, although curvatures placed on different corrective lenses, due to the inherent limitations of creating the laps, may be incrementally different (that is, the minimum difference in curvature between two lenses may be around 0.125 diopters). Thus, using lathes and laps, the creation of surfaces on lens has often been limited in surface type (generally spherical surfaces) and in specification of the curvature (generally incremental from one lens to a next lens).

Additionally, lenses having a strong prescription (such as those requiring large radii of curvature) are often bulky and inconvenient to a user wearing eyeglasses with such lenses. These users may suffer from the "coke bottle effect," where the thickness of the lens causes the eyeglasses (and the user wearing them) to look unattractive at the periphery of the lenses. These and other problems exist with respect to current eyeglass lens manufacturing.

DETAILED DESCRIPTION

A system and method for creating aspherical, custom-designed back surfaces on lenses used in eyeglasses is described. In some examples, the system creates a surface on a lens having a specified radius of curvature at the center along with a thinner portion at the periphery of the lens. The system may produce curves on lens surfaces that non-spherically change in curvature from the center of the lens to the periphery. For example, the system may create conic-based surfaces, such as hyperbolic surfaces, that are substantially spherical, cylindrical, or spherocylindrical at a center point and substantially aspherical away from the center point.

In some cases, the system may employ digital surfacing in creating the curves on the lens surfaces. Digital surfacing, and other soft tool based surfacing, is a relatively new manufacturing technique in the industry that allows manufacturers to create an infinite number of surfaces on lenses, unlike previous lathing and lapping techniques described herein. For example, using digital surfacing, a diamond or other type of cutter produces a back surface of a lens according to a specified depth, at a precision of one tenth of a micron or less. Thus, digital surfacing, in some cases, enables manufacturers to create non-spherical surfaces on lenses.

In some cases, the system may provide manufacturers and other eye care professionals with simple adaptable prescriptions for patients, allowing the eye care professionals to easily create unique lenses that provide cosmetic, optical, and other benefits. For example, a prescription for a patient may define (1) a specific conic curve (or similar curve) that has a centrally located radius of curvature that may satisfy the optical needs of a patient and a (2) peripherally defined thickness of the lens that may satisfy the cosmetic needs of the patient.

Where previous techniques of creating concentric spheres across a surface (using lathes and laps) could not achieve such detailed requirements, forming conic sections on the back surfaces of lenses enables professionals to create lenses having patient specific optical and cosmetic benefits, while still maximizing the optical quality of the lenses.

Various examples of the technology will now be described. The following description provides specific details for a thorough understanding and enabling description of these examples. One skilled in the art will understand, however, that the technology may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Examples of Lenses

Figure 1:
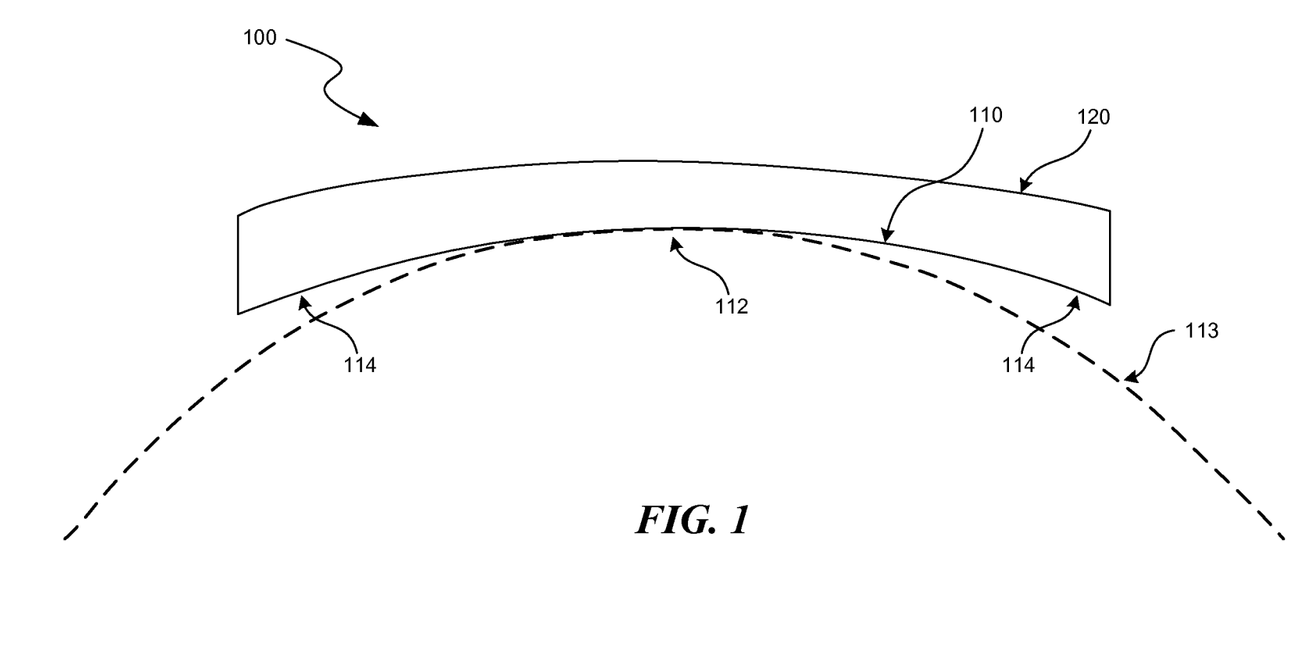
FIG. 1 is a diagram illustrating a cross-sectional view of a lens used in eyeglasses having an aspherically curved surface.

As described herein, aspects of the system and method enable eyeglass manufacturers and other eye care professionals to apply prescriptions to the back surfaces of lenses while tailoring the peripheries of the lenses to meet the needs of their patients. Many patients require strong corrections (e.g., those greater than +/−5.0 diopters), and may benefit from reducing the thickness of their lenses where possible. FIG. 1 shows a cross-sectional view of a concave lens 100 used in eyeglasses having an aspherically curved surface formed in accordance with the method disclosed herein. Lens 100 is a concave or minus lens, and is often used to correct nearsightedness in patients. Lens 100 has a back surface 110 and a front surface 120. Lens 100 may be a spherical lens, a cylindrical lens, or a spherocylindrical lens. The front surface 120 may be a spherical or aspherical curve, depending on the type of lens or type of corrections required for the eyeglass wearer. The back surface 110 is curved to meet the needs of the patient's prescription. At an optical center of the lens 112, the lens is spherically curved based on a prescribed correction. For example, lens 100 has a certain curvature at center 112 based on the radius of a circle defined by line 113.

The optical center of the lens is not necessarily the center of the lens. Often, the optical center is placed in front of a patient's pupil, in order to provide the best focus correction to the patient. In some cases, the optical center for a lens may be different for a patient's right eye than for the patient's left eye. Therefore, the optical center is often determined for each eye of a patient.

In typical eyeglass lenses, a back or rear surface of a lens follows the edge of the circle that defines the curvature of the lens. That is, the lens is spherical both at the center and at the periphery. However, in this case, the back surface 110 of the lens, at periphery 114, does not follow the circle that defines the radius of curvature. Instead, the saggital depth of the lens is reduced at or near the periphery, and the back surface 110 of the lens at the periphery 114 is aspherically curved. The thickness is reduced at the periphery, creating a lens that provides a prescribed optical correction to a patient without the drawbacks typical of thick lenses (e.g., unattractive, cumbersome, heavy, causes "image jump," and so on). For example, the aspherical curve at the periphery may be substantially similar to the curve of the front surface 120.

Additionally, in some cases, by thinning the lens and therefore changing the optical power at the periphery (thinning causes the radius of curvature to change), the lens may provide a patient with enhanced or advantageous optical properties (such as improved focus correction) through the peripheral portion of the lens.

Figure 2:
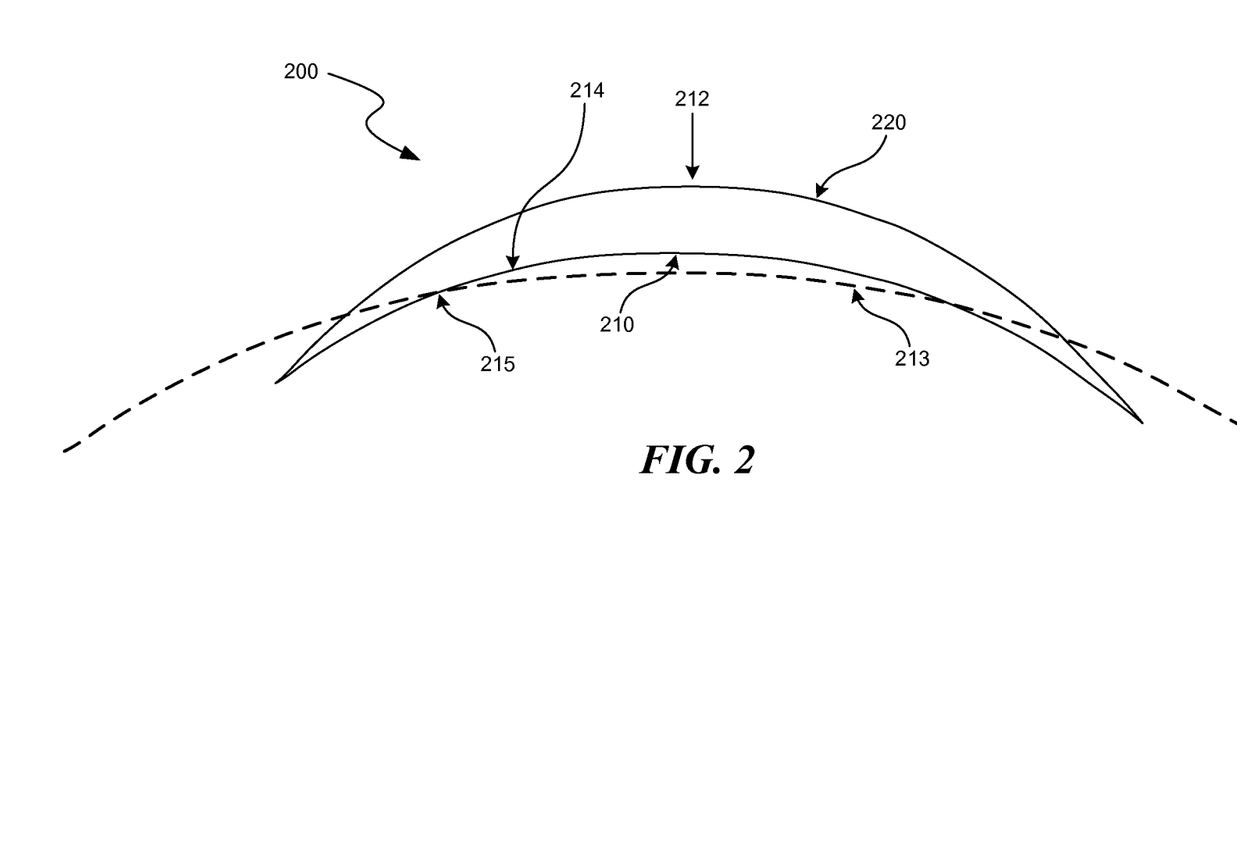
FIG. 2 is a diagram illustrating a cross-sectional view of an alternative lens used in eyeglasses having an aspherically curved surface.

Although the method of shaping lenses has been described herein with respect to concave lenses, some or all aspects of the system may be applied to convex lenses. FIG. 2 shows a cross-sectional view of a convex lens 200 used in eyeglasses having an aspherically curved surface. Lens 200 is a convex or plus lens, and is often used to correct farsightedness in patients. Lens 200 has a back surface 210 and a front surface 220. The front surface 220 may be a spherical or aspherical curve, depending on the type of lens or type of corrections required for the eyeglass wearer. The back surface 210 is curved to meet the needs of the patient's prescription. At an optical center of the lens 212, the lens is spherically curved based on a prescribed correction. For example, lens 200 has a certain curvature at center 212 based on the radius of a circle defined by line 213. In this example, the lens, at periphery 214, does not follow the circle. Instead, the saggital depth of the back surface 210 of the lens may be modified such that the back surface 210 of the lens at the periphery 214 is aspherically curved, while the back surface 210 at the optical center remains substantially similar to the optical center on line 213. In some cases, back surface 210 and line 213 approximately intersect at the edge 215 of the lens at the same point. However, the lens formed between 220 and 210 may be thinner in the center. Thus, in these cases, the thinning of the lens 200 occurs at or near the optical center 212, and not at the periphery 214 (e.g., at the edge 215). Similar to the concave lens 100 described herein, thinning the convex lens 200 provides a patient with a lens that satisfies a prescribed correction without the drawbacks associated therewith.

Of course, in addition to the lenses described herein, the system may be employed with other lenses. For example, the system may be applied to the front surfaces of lenses (such as lenses that are aspheric due to changes in the front surface of the lens) and to combination lenses, such as sphero-cylindrical lenses. Examples of other lens that may be employed by the system include biconvex lenses, biconcave lenses, planoconcave lenses, planoconvex lenses, meniscus lenses, concave-convex lenses, cylindrical lenses, and so on.

Also, varying a refractive index of a lens varies the optical power of the lens. Therefore, the system may factor in or take into account the refractive index of a lens when determining how to modify the thickness of a lens at the periphery.

Additionally, although the above examples show a two-dimensional cross-section of a lens, the system may be employed at different cross sections of a single lens. That is, the system may create a surface on a lens that has one peripheral thickness at a first cross-section and a different peripheral thickness at a second cross-section. The lens may have many different thicknesses at a certain radial distance from the optical center, depending on the needs of the patient. For example, the system may create a back surface from many different two-dimensional aspherical curves combined to create an aspherical three-dimensional surface.

Creating an Aspherical Surface on a Lens

Figure 3:
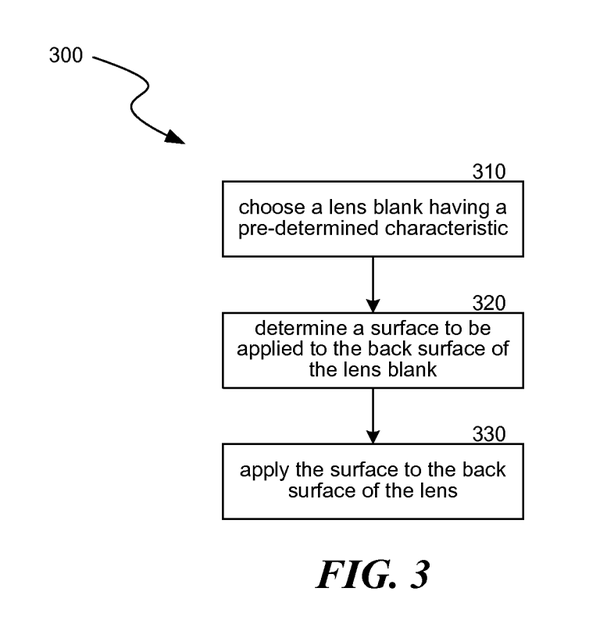
FIG. 3 is a flow diagram illustrating a process of manufacturing an aspherical lens.

As described herein, the system creates aspherical surfaces on lenses in order to provide lenses with prescribed optical corrections and enhanced cosmetic appearances. FIG. 3 illustrates a routine 300 for manufacturing an aspherical lens. In step 310, a lens manufacturer or eye care professional (such as an optician creating lenses at an eyeglass vendor) chooses a lens blank having a pre-determined characteristic, such as a base curve on the front surface of the lens blank. Lens blanks may be precut lenses having base curves of varying intervals of correction (e.g., −1.0 D, −2.0 D, and so on) that provide a starting point for an eye care professional. An eye care professional, upon receiving a prescription for a patient, may choose a suitable lens blank to begin creating the patient's prescribed lens.

In step 320, the eye care professional, another person, or a computing system or computer application associated with the eye care professional determines the surface to be applied to the back surface of the lens blank. For example, the prescription may require a spherical surface at an optical center of the lens and an aspherical surface at or near a periphery of the lens. Further details with respect to determining the surface will be discussed with respect to FIGS. 4A-4B.

Figure 4A:
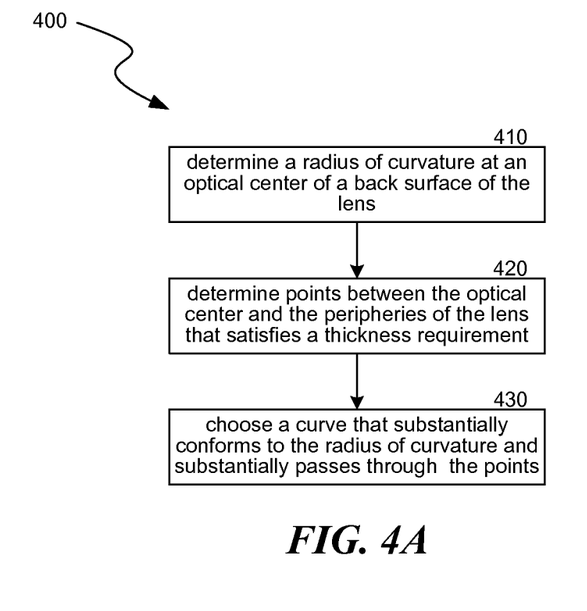
FIG. 4A is a flow diagram illustrating a process of determining a back surface of an aspherical lens.

Referring to FIG. 4A, a flow diagram illustrating a routine 400 of determining a surface of an aspherical lens is shown. In step 410, routine 400 determines a radius of curvature to apply at the optical center of the back surface of the lens. For example, the eye care professional may receive a prescription that defines the radius of curvature. In step 420, routine 400 determines a point or points between the optical center and the periphery of the lens and a thickness requirement at these points, such as one point, a few points, or a ring of points from the optical center. For example, routine 400 may receive instructions to reduce the thickness at a certain radial distance from the optical center, and determine a point at the radial distance within the lens that provides the required thickness. In step 430, routine 400 determines or fits a curve that substantially conforms to the radius of curvature determined in step 410 and to the point(s) determined in step 420. For example, the system may determine the best fit curve is a hyperbola that substantially conforms to the radius of curvature and substantially passes through or fits the determined points. The system may also determine the curve to be an ellipse (or portion of an ellipse). The system, therefore, may determine the curve to be a hyperbola, parabola, ellipse, or other conic section suitable to satisfy the determined characteristics. In these cases, the curve will be substantially spherical at or near the optical center of the lens and substantially aspherical at or near the periphery.

For example, a prescription calls for a corrective lens having an index of refraction of 1.53 and a radius of curvature of −6.0 diopters (D) on the back surface of the lens (the surface closer to the eye of a patient). In this case, such a prescription causes the periphery to be undesirably thick. Therefore, in addition to the corrective requirements, the prescription also indicates that the lens should be thinned near the edges (e.g., 50 mm from the optical center of the lens) in order to reduce the radius of curvature 1 diopter, to −5.0 D. Therefore, the prescription calls for a back surface having a radius of curvature of −6.0 D at 0 mm from the optical center of the lens, and a radius of curvature of −5.0 D at 50 mm from the optical center of the lens in all directions (that is, at all points around the center). Fitting a curve that substantially satisfies these requirements will cause the back surface to be substantially spherical at the optical center and substantially aspherical at the periphery of the lens.

Figure 4B:
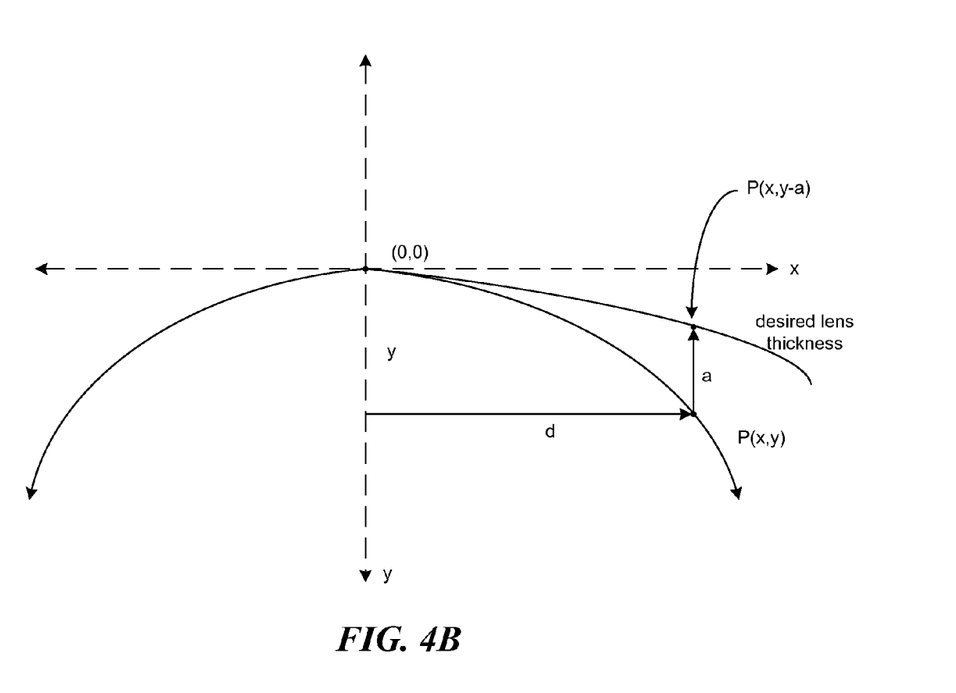
FIG. 4B is a diagram illustrating an exemplary hyperbolic curve.

We can find a hyperbolic curve that satisfies these requirements for the back surface. Referring to FIG. 4B, a graph of a hyperbola 440 is shown. The lower half of the hyperbola is placed with foci along the y-axis (also the axis that pass through the optical center of the lens in this example). Using a curvature formula for the hyperbola, and given a predetermined radius of curvature and desired thickness of the lens (y−a) at a certain distance from the center (d), we can determine hyperbolic curves to be applied to the back surface in all directions. In the current example, the radius of curvature is =−16.0 D at 0 mm and −5.0 D at 50 mm. Thus, we can determine the value of the focus (for the lower half curve) to be approximately 8.2 mm. Using the value for the focus, we can then find values for thinning the saggital depth (a) at various distances from the center of the hyperbola. For example, at d=5 mm the saggital depth is about 0.1 mm, and at d=20 mm the saggital depth is about 2.2 mm. Thus, we determine hyperbolic curves that substantially fit these points and create a back surface for a lens that provides the prescribed radius of curvature with desired peripheral changes.

Of course, as described herein, other curves may be employed by the system. For example, the system may determine that other conics best fit a required radius of curvature and saggital depths, as described herein. In addition, the system may create two or more curves that satisfy the prescribed requirements. For example, the system may use piecewise functions, where one of the functions fits the spherical radius of curvature at the center of the lens and the other functions fit the aspherical periphery. Also, the system may create more than one curve when forming the lens surface. As lenses are three-dimensional, the system may create many curves in two dimensions that combined form a three-dimensional surface.

Referring back to FIG. 3, after a curve and or surface is determined, such as using the methods described with respect to FIG. 4A-4B, routine 300 applies the surface to the back surface of the lens. In this example, the back surface is the surface closer to the patient. However, as described herein, the system may apply the surface to the front surface of the lens as well, or to both surfaces.

In order to apply a continuous, even surface, the system may employ digital surfacing or other similar techniques. As described herein, using lathes and laps does not allow for the implementation of a conic surface onto the lens. Digital surfacing, however, enables the system to form conic or conic-based surfaces on lenses that provide the required optical corrections and peripheral enhancements.

Developing Lenses for Patients

In order to convey the creation of the aspherical surfaces described herein to eye care professionals, the system may provide a few parameters when defining a prescription. FIGS. 5A-5D illustrate the process of defining requirements of an aspherical lens with a reduced peripheral thickness.

Figure 5A:
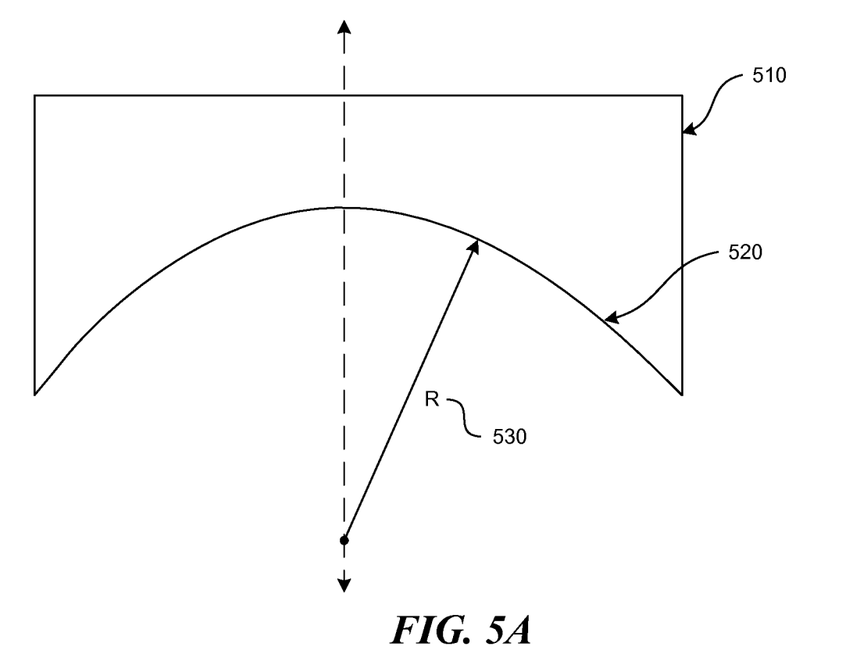
FIGS. 5A-5D are block diagrams illustrating example stages of manufacturing an aspherical lens.
Figure 5B:
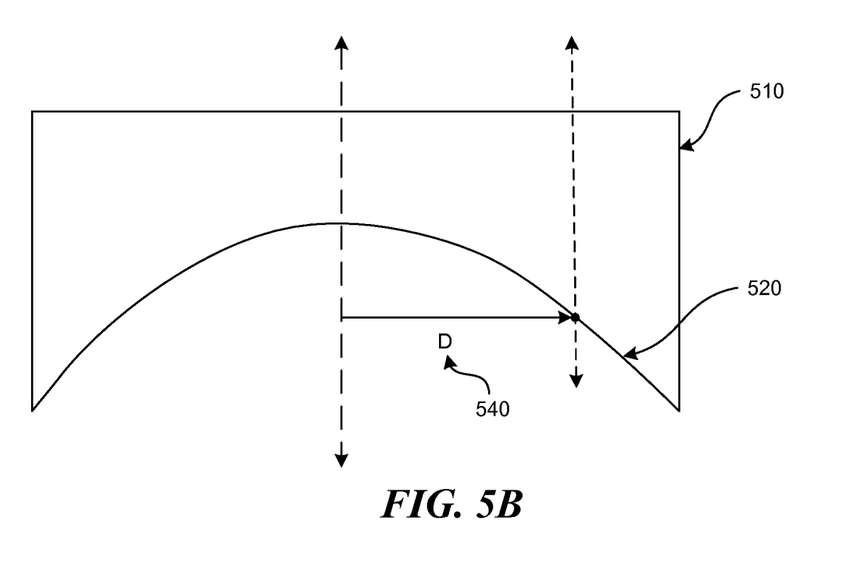
Figure 5C:
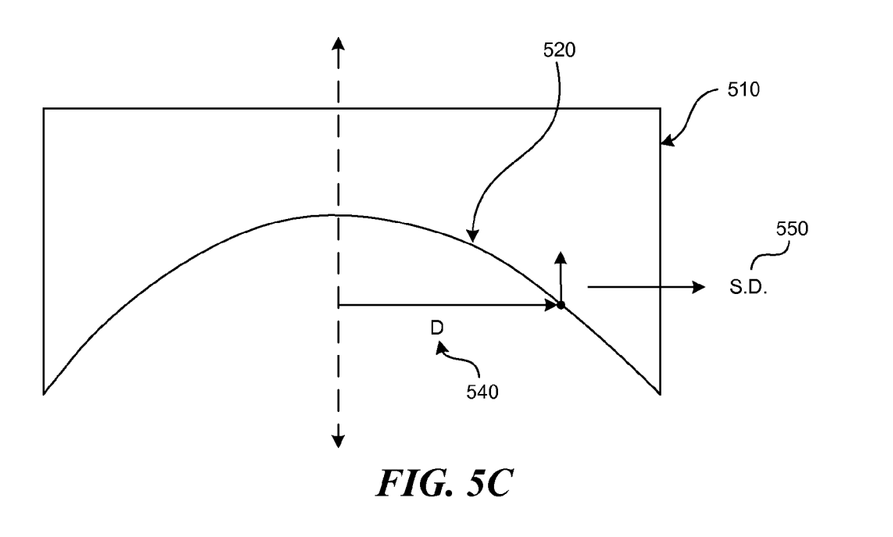
Figure 5D:
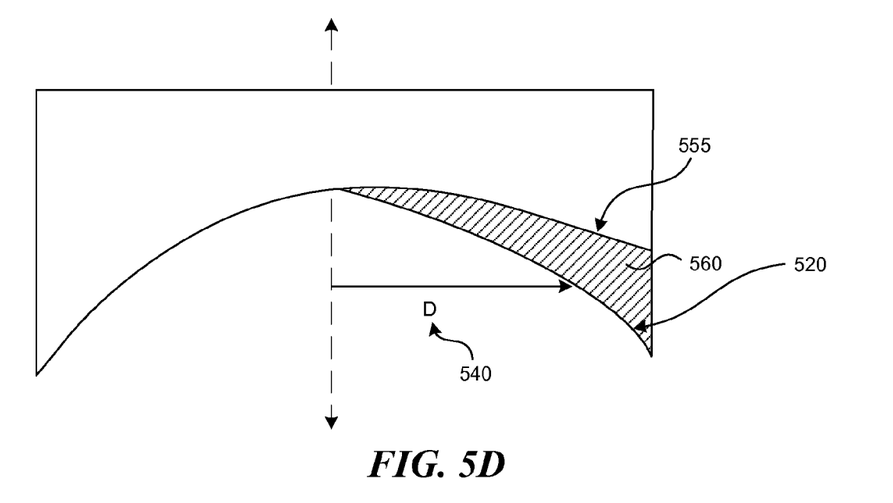

For example, in FIG. 5A, the system creates a lens 510 having a back surface 520 curved (such as spherically curved) with a radius of curvature 530 equal to R. In FIG. 5B, the system determines a radial distance 540 equal to D at a point on surface 520 of the lens 510. In FIG. 530, the system determines a point having a saggital depth 550 equal to S.D. at the radial distance D. Finally, in FIG. 5D, the system creates a curve 555 that fits the point at the saggital depth 550. Thus, as shown in the Figure, a portion 560 of the lens is removed in order to create the new curve 555 at the desired depth S.D. at the radial distance D.

Figure 6:
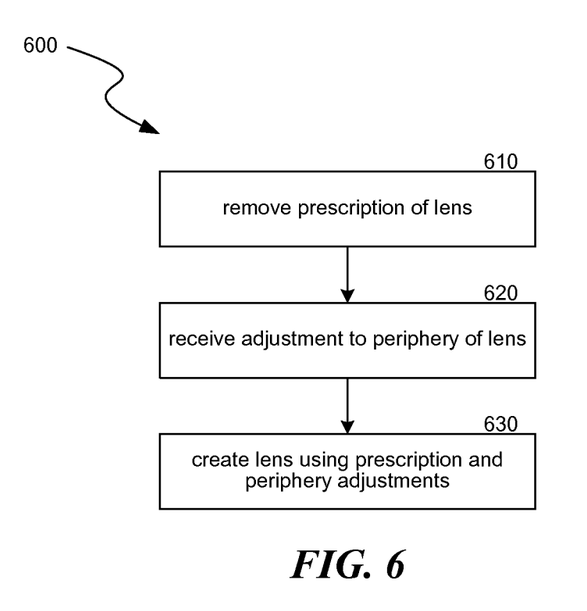
FIG. 6 is a flow diagram illustrating a process of forming a prescription eyeglass lens.

FIG. 6 illustrates a routine 600 that summarizes the steps performed by an eye care professional in creating the lenses described herein. In step 610, the professional receives a prescription for the lens. The prescription may provide information related to a type of lens, a material for the lens, which eye, a spherical or cylindrical correction, and so on. For example, the routine 600 receives a prescription for a spherical correction of −4.0 diopters for the left eye.

In step 620, the eye care professional receives an adjustment for the periphery of the lens. The adjustment may provide information related to the placement of the adjustment, such as at what radial length from the optical center of the lens or at what direction of the lens, or it may include a general characterization of the adjustment, such as "reduce the saggital depth" at the periphery. In addition, the adjustment may provide information related to the thickness reduction. The adjustment may be specified in a variety of ways. For example, the adjustment may define a certain optical power adjustment (e.g., reduce −1.0 D at 30 mm), a certain percentage (e.g., reduce 30% at 35 mm), a certain distance (e.g., reduce 3 mm at 35 mm), and so on. Additionally, the adjustment may be a general specification that does not necessarily define the exact adjustment. For example, the adjustment may be a "small reduction of lens thickness," a "an average reduction," a "large reduction," and so on.

In step 630, the eye care professional creates the lens using the prescription and any periphery adjustments. Thus, a simple method of defining the parameters of a lens for use in eyeglasses is created.

Adjustment information may be provided to eye care professionals in a variety of ways. For example, the system may use a computer application, and add fields directed to reducing the thickness of the lens in the computer application. Additionally, the system may create prescription pads or other similar paper-based products commonly used by eye doctors and other eye care professionals.

Figure 7:
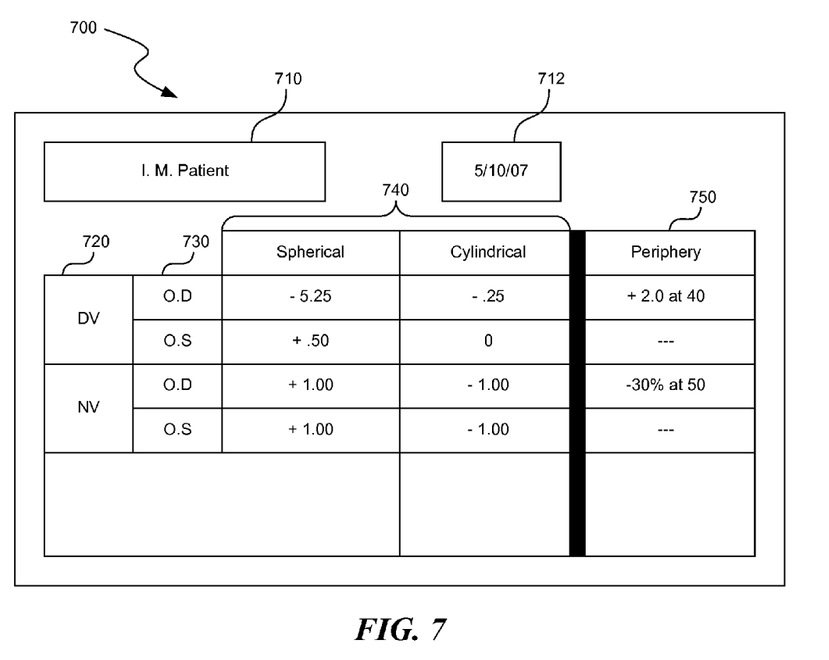
FIG. 7 is a diagram illustrating a prescription order form.

For example, FIG. 7 is a diagram illustrating a prescription order form 700 that may be implemented as a prescription pad or into a computer application. Form 700 may include typical information found in prescriptions, such as a patient name 710, date 712 and other personal information (address, phone number and so on). Form 700 may also include prescription information, such as information 720 related to distance vision (D.V.) or near vision (N.V.), information 730 related to the eye (O.D. for right eye or O.S. for left eye) and the recommended correction 740. For example, in form 700, a doctor prescribes a spherical correction of −5.25 D for the right eye of a patient.

Form 700 may also contain periphery reduction information 750, as described herein. For example, the form 700 may define a reduction of +2.0 D at a radial distance of 40 mm for the right eye lens, and a reduction of 30% at 50 mm for the left eye lens.

Thus, the system may be integrated into other typical prescription forms and applications, enabling eye care professionals to create these lenses in a similar fashion to lenses that do not require peripheral adjustments, among other benefits.

CONCLUSION

Thus, the system and method creates custom-specified, prescription aspheric surfaces having reduced peripheries on lenses for eyeglasses. In forming these aspheric surfaces on the back surfaces of lenses (the surfaces closer to the eye), the system is able to place the center of asphericity anywhere on the lens. Reducing the thicknesses provides many benefits, such as thinner and more attractive lenses, lighter lenses, visual enhancements (such as when thinning counteracts magnification at the edges of a lens or reduces "image jump" or the "jack-in-the-box" effect), and other benefits.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. Accordingly, the technology is not limited except as by the appended claims.

We claim:

1. A spherocylindrical lens for use with eyeglasses, the lens comprising:
    a front surface; and
    a back surface,
        wherein at least one cross-section of the back surface is defined by one or more conic sections,
        wherein the conic sections exclude a circle,
        wherein the back surface includes a first area and a second area,
        wherein the first area of the lens contains an optical center of the lens,
        wherein the conic section in the first area substantially conforms to a radius of curvature based at least upon a lens prescription,
        wherein the conic section meets a predetermined saggital depth at one point in the second area of the lens, and
        wherein the predetermined saggital depth differs from the lens prescription of the first area.

2. The spherocylindrical lens of claim 1, wherein one or more additional cross-sections of the back surface are defined by one or more additional conic sections, and in the second area of the lens, the one or more additional conic sections meet additional predetermined saggital depths at one or more additional points.

3. The spherocylindrical lens of claim 1, wherein the predetermined saggital depth is less than a spherical saggital depth if the back surface is defined by a spherical surface.

4. The spherocylindrical lens of claim 1, wherein digital surfacing is used to create the one or more conic sections.

5. The spherocylindrical lens of claim 1, wherein digital surfacing merges the conic sections on the back surface of the lens.

6. The spherocylindrical lens of claim 1, wherein the second area of the lens portion has at least one radius of curvature that continuously changes from the first area to substantially an edge of the lens.

7. The spherocylindrical lens of claim 1, wherein the front surface is pre-finished in any lens style, including a single vision or multifocal lens.

8. A spherocylindrical lens for use with eyeglasses comprising:
    a front surface; and
    a back surface having a centrally located first area and a peripherally located second area,
        wherein at least one cross-section of the back surface is defined by one or more conic sections,
        wherein, in the first area, the conic section substantially conforms to a radius of curvature based at least in part upon a lens prescription,
        wherein, in the second area, the conic section meets a predetermined saggital depth at a point in the second area of the lens, and the conic section excludes a circle, and
        wherein the predetermined saggital depth differs from the lens prescription.

9. The spherocylindrical lens of claim 8, wherein the predetermined saggital depth is less than a spherical saggital depth if the back surface is defined by a spherical surface.

10. The spherocylindrical lens of claim 8, wherein the predetermined saggital depth in the second area of the lens is more than a thickness of the lens in the first area.

11. The spherocylindrical lens of claim 8, wherein the first and the second areas are merged by digital surfacing.

12. The spherocylindrical lens of claim 8, wherein a radius of curvature in the second area changes continuously.

13. The spherocylindrical lens of claim 8, wherein the front surface is spherical or aspherical.

14. A lens for use with eyeglasses comprising:
    a front surface; and
    a back surface having a centrally located first area and a peripherally located second area,
        wherein at least one cross-section of the back surface is defined by one or more conic sections,
        wherein, in the first area, the conic section substantially conforms to a radius of curvature based at least in part upon a lens prescription,
        wherein, in the second area, the conic section meets a predetermined saggital depth at a point in the second area of the lens, and the conic section excludes a circle, and
        wherein the predetermined saggital depth differs from the lens prescription.

15. The lens of claim 14, wherein the lens is selected from a group including biconvex, biconcave, planoconcave, planoconvex, meniscus, concave-convex, and cylindrical lenses.

16. The lens of claim 14, wherein the predetermined saggital depth is less than a spherical saggital depth if the back surface is defined by a spherical surface.

17. The lens of claim 14, wherein the predetermined saggital depth in the second area of the lens is more than a thickness of the lens in the first area.

18. The lens of claim 14, wherein the first and the second areas are merged by digital surfacing.

19. The lens of claim 14, wherein the back surface is an aspherical three-dimensional surface.

20. The lens of claim 14, wherein the conic section in the first area is spherical and the conic section in the second area is aspherical.

21. The lens of claim 14, wherein the front surface of the lens is defined by a centrally located third area and a peripherally located fourth area,
    wherein at least one cross-section of the third area is defined by a third conic section, and
    wherein at least one cross-section of the fourth area is defined by a fourth conic section.

22. The lens of claim 21, wherein third conic section is different from the fourth conic section.

\* \* \* \* \*

UNITED STATES PATENT AND TRADEMARK OFFICE
CERTIFICATE OF CORRECTION

Page 1 of 2

PATENT NO. : 8,950,858 B2
APPLICATION NO. : 14/290661
DATED : February 10, 2015
INVENTOR(S) : Gordon Keane et al.

It is certified that error appears in the above-identified patent and that said Letters Patent is hereby corrected as shown below:

In the Specification

In column 3, line 30, delete "saggital" and insert -- sagittal --, therefor.

In column 3, line 60, delete "saggital" and insert -- sagittal --, therefor.

In column 5, line 40, delete "-16.0 D" and insert -- -6.0 --, therefor.

In column 5, line 43, delete "saggital" and insert -- sagittal --, therefor.

In column 5, line 45, delete "saggital" and insert -- sagittal --, therefor.

In column 5, line 46, delete "saggital" and insert -- sagittal --, therefor.

In column 5, line 53, delete "saggital" and insert -- sagittal --, therefor.

In column 5, line 63, delete "and or" and insert -- and/or --, therefor.

In column 6, line 21, delete "saggital" and insert -- sagittal --, therefor.

In column 6, line 23, delete "saggital" and insert -- sagittal --, therefor.

In column 6, line 40-41, delete "saggital" and insert -- sagittal --, therefor.

In the Claims

In column 7, line 54-55, in claim 1, delete "saggital" and insert -- sagittal --, therefor.

In column 7, line 57, in claim 1, delete "saggital" and insert -- sagittal --, therefor.

In column 7, line 63, in claim 2, delete "saggital" and insert -- sagittal --, therefor.

In column 7, line 66, in claim 3, delete "saggital" and insert -- sagittal --, therefor.

In column 7, line 66, in claim 3, delete "saggital" and insert -- sagittal --, therefor.

In column 8, line 25, in claim 8, delete "saggital" and insert -- sagittal --, therefor.

In column 8, line 28, in claim 8, delete "saggital" and insert -- sagittal --, therefor.

In column 8, line 31, in claim 9, delete "saggital" and insert -- sagittal --, therefor.

In column 8, line 31, in claim 9, delete "saggital" and insert -- sagittal --, therefor.

Signed and Sealed this
Thirtieth Day of June, 2015

Michelle K. Lee
*Director of the United States Patent and Trademark Office*

CERTIFICATE OF CORRECTION (continued)
U.S. Pat. No. 8,950,858 B2

In column 8, line 34, in claim 10, delete "saggital" and insert -- sagittal --, therefor.

In column 8, line 52, in claim 14, delete "saggital" and insert -- sagittal --, therefor.

In column 8, line 55, in claim 14, delete "saggital" and insert -- sagittal --, therefor.

In column 8, line 60-61, in claim 16, delete "saggital" and insert-- sagittal --, therefor.

In column 8, line 61, in claim 16, delete "saggital" and insert -- sagittal --, therefor.

In column 8, line 63-64, in claim 17, delete "saggital" and insert -- sagittal --, therefor.